Sept. 30, 1958 — E. SCHLUETER — 2,853,752
POSITIVELY LOCKED LINK LOCK FASTENER
Filed Dec. 17, 1952 — 2 Sheets-Sheet 1
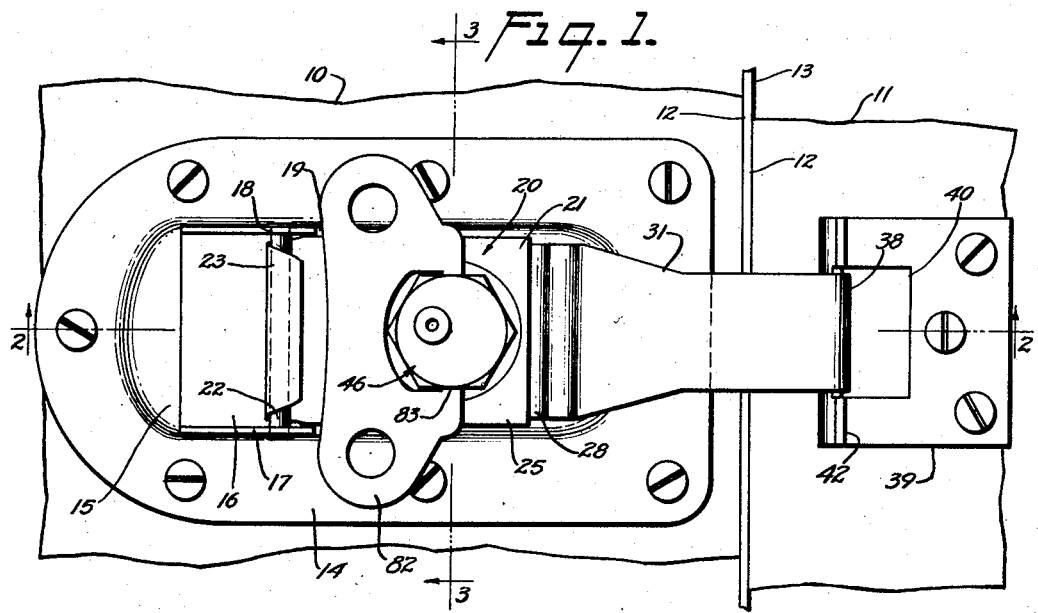
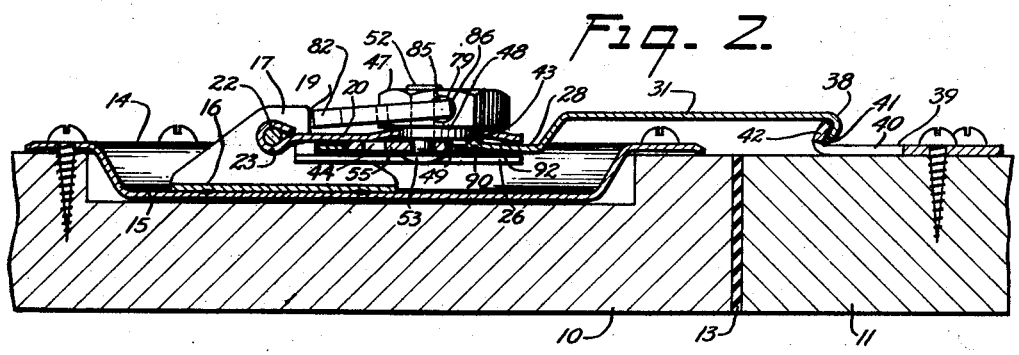
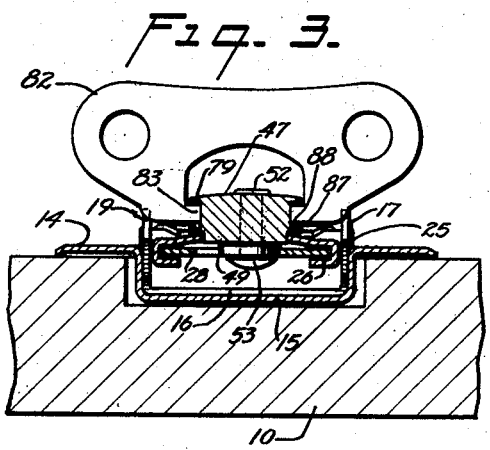
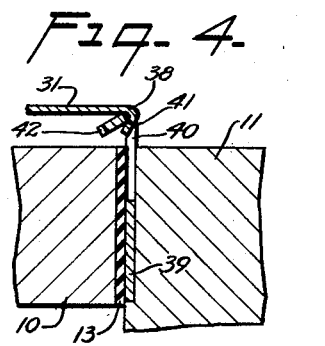
INVENTOR.
ERNEST SCHLUETER
BY
ATTORNEY.

Sept. 30, 1958 E. SCHLUETER 2,853,752
POSITIVELY LOCKED LINK LOCK FASTENER
Filed Dec. 17, 1952 2 Sheets-Sheet 2
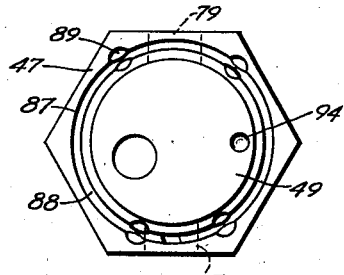
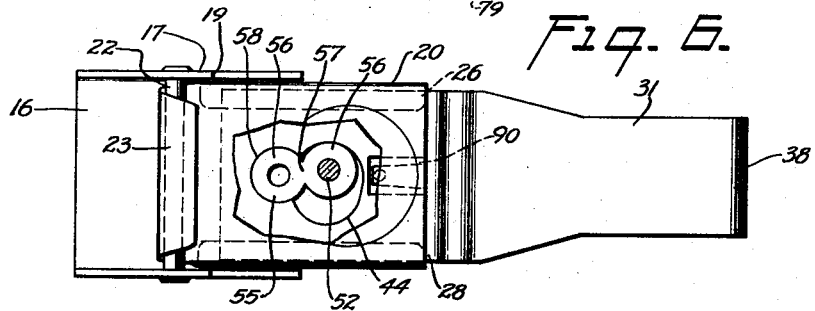
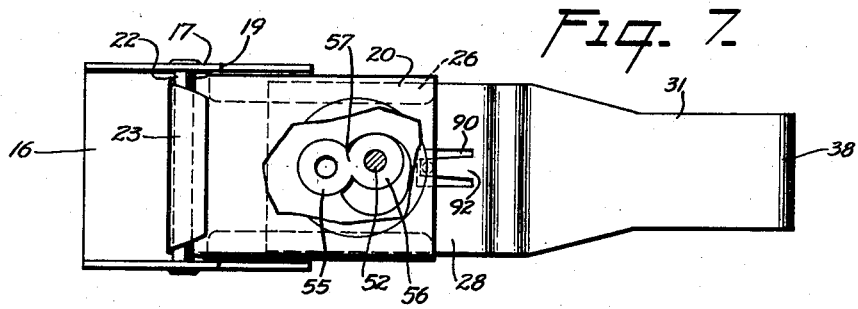
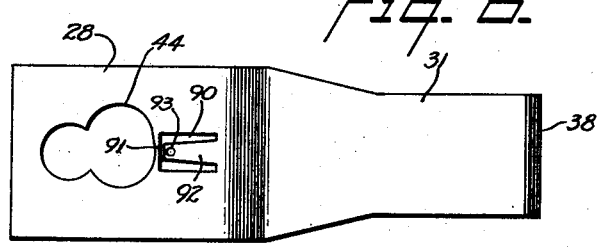
INVENTOR.
ERNEST SCHLUETER
BY
ATTORNEY.

United States Patent Office 2,853,752
Patented Sept. 30, 1958

2,853,752

POSITIVELY LOCKED LINK LOCK FASTENER

Ernest Schlueter, Troy, N. Y., assignor to Simmons Fastener Corporation, Albany, N. Y., a corporation of New York Application December 17, 1952, Serial No. 326,465

13 Claims. (Cl. 20—92)

This invention relates to fastening devices and fasteners and to means for fastening together adjacent structures and more particularly to devices for locking or fastening together adjacent panels of portable houses, large packing cases, trunks or the like, though it is noted that in many of the claims the invention is not limited to securing panels.

Objects of the invention are to provide an improved very strong fastening device of this kind which may be quickly operated to reliably secure two structures together, and which will unyieldably or automatically yieldably draw the structures together and remain in locked or unlocked position and which will accommodate inaccuracies and misalinement when bringing the structures together.

Other objects of the invention are to provide an improved device of this kind adaptable for panels or the like in the same plane or at a right angle to each other and to provide means for locking the fastener in locked position.

Additional objects of the invention are to effect simplicity and efficiency in such fasteners and to provide an extremely simple device of this kind which is convenient, speedy, durable and reliable in operation, and economical to manufacture and install.

Still other objects of the invention will appear as the description proceeds; and while herein details of the invention are described in the specification and some of the claims, the invention as described in the broader claims is not limited to these, and many and various changes may be made without departing from the scope of the invention as claimed in the broader claims.

The inventive features for the accomplishment of these and other objects are shown herein in connection with a link-type fastener or lock for securing together panels meeting in a butt joint. Said fastener comprises a hasp member pivoted on a pivot pin mounted on one panel, and a slide member telescopically slidable on the inner face of the hasp member and provided with a free end hook adapted to engage a keeper plate secured on the other panel and having a lip with which said hook may lock and unlock when the slide member telescopes. Said members are provided with partially registering openings in which are disposed a partially rotary bolt having an outer end head and carrying an intermediate part rotary in said openings and parts engageable with edges of the opening of the slide member and movable to locking position to draw the members together to a locking position and movable to another position to extend the slide member to unlocking position. Means are provided for locking the bolt in locking position.

In the accompanying drawing showing, by way of example, several of many possible embodiments of the invention, Fig. 1 is a fragmental elevation showing one form of the fastener applied to two structures;

Fig. 2 is a sectional view taken on the line 2—2 of Fig. 1;

Fig. 3 is an enlarged sectional view taken on the line 3—3 of Fig. 1;

Fig. 4 is a fragmental longitudinal sectional view showing the keeper plate and one panel perpendicular to the other panel;

Fig. 5 is an enlarged inner end elevation of the bolt;

Figs. 6 and 7 are inner elevations partly broken away and partly in section showing two positions of parts of the invention; and Fig. 8 is a front elevation of the slide member.

My improved fastener is suitable for fastening together elements of portable houses, packing cases and other structures such as a pair of thick panels 10, 11 disposed in the same plane and meeting in a butt joint having butt faces 12 perpendicular to said plane and having a gasket 13 compressed therebetween. An approximately rectangular pivot-carrying plate 14 is secured by screws fast to the face of one panel near the joint and having side edges parallel and approximately perpendicular to the joint faces and has its intramarginal part 15 depressed and inset in the panel 10. A pivot bracket 16 welded or otherwise secured fast on the depressed part has parallel upturned side ears 17 having alined bearing apertures 18 and edge shoulders 19 near and facing from the apertures toward the other panel.

A substantially flat hasp member 20 has a pivot end part 23 in said depressed part and curved under and over a pin 22 in said apertures 18, whereby the hasp may be swung to positions substantially parallel, or perpendicular to or at angles to said panels and moved to lie over said gasket or remote therefrom. The main part 21 of the hasp member is provided in said depressed part with side edge flanges 25 turned toward the plate and inwardly toward each other to form guide ways 26 (Fig. 3) extending toward the butt joint. A flat slide plate member 28 having its side edges slidable in said guide ways 26 has a projecting end portion 31 outwardly offset from said main part and projecting across said butt joint and bent toward the panel and slightly toward said joint to form a wide hook 38.

An approximately rectangular keeper plate 39 mounted on the other panel 11 has its margin nearest said hasp member inclined in a direction away from the panels and hasp member to form a keeper lip 42, whereby said wide hook 38 may engage the lip when the slide member telescopes to an inner locking position in said ways, and whereby said hook may clear the lip when the slide member moves to an outer unlocking position in said guide ways. Said keeper plate is provided intramarginally with a rectangular cut-out 40 having side edges near the side edges of the plate and an edge formed by the inner edge 41 of said lip 42, whereby said keeper plate may be mounted as in Fig. 4, adjacent to the butt face of the hasp carrying panel, inset in the wide face of a keeper carrying panel 11 perpendicular to the panel 10 and having a wide face adjacent to said butt face 12 of the panel 10 and having its edge flush with the wide outer face of said panel 10, whereby said side hook may engage over the said inner edge 41 of the lip to draw the wide face of the keeper panel 11 against the butt face of the hasp carrying panel 10. As shown in the drawing, the lip of the hook 38 makes an angle slightly greater than 45° and the keeper hook about 45° with the panels.

Said hasp member 20 and said slide member 28 are provided midway between said guide ways with partially registering openings 43, 44 (Figs. 2 and 8), the opening 43 in the hasp member being round and receiving an eccentric-carrying bolt 46 (Fig. 1) disposed in the round opening 43 and having an annular outer head 47 (Figs. 1 and 3) and a reduced inner end 48 (Fig. 1) in said round opening having a flat end face 49 (Fig. 3)

perpendicular to its axis and substantially flush with the inner face of the hasp member. An eccentric pin 52 fast in said bolt and projecting from said flat end face is provided with a rivet head 53 forming a shoulder in the plane of the exposed face of the slide member. A short flat link 55 (Figs. 2 and 6) in said opening of the slide member is pivoted on the eccentric pin 52 and has an approximately complete circular end 56 (Fig. 6) and a narrow neck 57 connecting the circular end with the pivot end. The opening 44 of the slide member has a partly closed circular part 58 nearest the pivot carrying member and opening toward the pivot pin and pivotally receiving said circular end 56, said opening being formed to allow the eccentric pin to move with a toggle action from dead center to dead center and slightly beyond, and to stop the pin when it moves slightly beyond the dead center. The eccentric pin 52 is such a distance from the axis of the bolt 46 and the keeper lip 42 that when the eccentric pin is nearest said lip, said hook 38 may clear the keeper lip, and when said eccentric pin is at the dead center most remote from the keeper lip, said hook tightly engages the lip to force the panels together.

Alined bores 79 (Figs. 2 and 5) at diametrically opposite sides of the bolt head 47 pivotally receive inturned pivot journals 83 (Fig. 3) of a butterfly 82, whereby the butterfly may be disposed in raised position, as in Fig. 3, diametrically of the bolt thus adapting the bolt to be turned by hand in locking position, or turned substantially against said side ears and edge shoulders 19 of the pivot bracket, as in Fig. 2, to hold the bolt from rotation in locked or unlocked position of the slide member. Said pivot journals 83 are square in cross section providing side faces 85, 86 parallel and perpendicular to the plane of the butterfly. The inner face of the bolt head is provided near the periphery with an annular groove 87 (Fig. 5) receiving a spring-split ring 88 swaged or otherwise anchored as at 89 remote from said journals, said ring pressing against said side faces 86 or 85 to yieldably hold the butterfly in said raised position or in locking position adjacent to the edge shoulder 19 of side ears 17. The slide member is axially provided with a U-shaped slot or cut 90 having its yoke-part 91 adjacent to said opening 44 of the slide member and forming a tongue 92 provided with an indentation 93 received in a recess 94 (Fig. 5) in the flat end face 49 of the bolt near its periphery, when the bolt is in locking position, to yieldably stop the bolt in locking position when the butterfly is raised, or if it or the edge shoulders 19 are not provided.

I claim as my invention:

1. A fastener for securing together panels having adjacent edges, said fastener comprising a keeper adapted to be secured on the panel; approximately alined superposed relatively longitudinally slidable hasp and slide members adjacent to said edges, the slide member having a hook adapted to catch on the keeper, the hasp member being adapted to be pivoted to the other panel; means for holding said members against any transverse and rotary movements in any direction relative to each other in all relative positions of the members, said members being provided midway between their side edges with partially registering openings, the opening in the hasp member being round; an eccentric-carrying bolt disposed in the round opening and having an outer head, a reduced inner end in said round opening having a flat end face perpendicular to the axis and flush with the inner face of the hasp member; an eccentric pin fast in said bolt and projecting from said flat end and provided with a head forming a shoulder flush with the inner face of the inner plate; and a short flat link in said opening of the slide member and pivoted on the eccentric pin, and having an approximately complete circular end and a narrow neck connecting the circular end with the pivot end; means pivotally connecting said circular end with the slide member.

2. A fastener for securing together panels having adjacent edges to one of which panels a keeper is adapted to be secured; said fastener comprising; approximately alined superposed relatively slidable telescoping outer hasp member and inner slide members adjacent to said edges, the slide member having a hook adapted to catch on the keeper, the hasp member being adapted to be pivoted to the other panel; means for holding said members against any transverse and rotary movements in any direction relative to each other in all relative positions of the members said members being provided with partially registering openings, the opening in the hasp member being round, a bolt in said round opening having a flat end face flush with the inner face of the hasp member; an eccentric pin fast in the bolt and projecting from the flat face; a short flat link in said opening of the slide member and pivoted at one end to said eccentric pin and having its outer end extended toward the pivot pin and pivotally connected to the slide member; said opening of the slide member being formed large enough to allow eccentric pin to move from dead center to dead center with a toggle action; said eccentric pin being such distance from the axis of the bolt and the keeper lip that said bolt may be moved to cause the hook to clear the lip or to force said panels together.

3. A fastener for fastening together panels having adjacent faces; said fastener comprising a keeper adapted to be secured on one panel; a bracket adapted to be mounted on the other panel and having parallel upturned side ears having edge shoulders facing toward the keeper; superposed approximately alined relatively slidable members adjacent to said faces, one having a hook adapted to catch on the keeper lip, the other being pivoted between said ears; a bolt passing through said members and having a head on the outer member; means carried by said members and bolt for drawing the members together; said bolt head having alined bores at diametrically opposite sides of the bolt head; a butterfly having inturned pivot journals pivotally received in said bores, whereby the butterfly may be disposed in raised position diametrically of the bolt, thus adapting the bolt to be turned by hand in locking position or substantially against the side ears and edge shoulders of the pivot bracket to hold the bolt from rotation in locked or unlocked position of the slide member.

4. A fastening device for securing together a pair of panels having adjacent edge faces, said device comprising a keeper adapted to be mounted on one panel; a bracket adapted to be mounted fast on the other panel and having parallel upturned side ears having alined bearing apertures and edge shoulders near and facing from the apertures toward the other panel; a pivot pin in said apertures; a substantially flat hasp member having a main pivot end part curved under and over said pin; whereby the hasp may be swung to positions substantially parallel, or perpendicular to or at angles to said panel and moved to lie across said edges and remote therefrom; said main part of the hasp member being provided with side edge flanges turned toward the panel and inwardly toward each other to form guide ways; a flat side plate member having its side edges slidable in said guide ways; said plate member having a projecting end portion outwardly offset from said main part and projecting across said faces and bent toward the panel and slightly toward said faces to form a wide hook engageable over said lip; and means carried by said members for drawing the members together and comprising a bolt operatively connected to the members and having a butterfly pivoted to said bolt and disposable flat against said bracket with its edge in engagement with both of said shoulders to hold the bolt from rotating when said members are drawn together.

5. A fastener for securing together panels having adjacent faces, said fastener comprising a keeper adapted to be secured on one panel; approximately alined relatively slidable outer hasp and inner slide members adjacent to said faces, one member having a hook adapted to catch on the keeper, the other member being pivoted to the other panel; a bolt passing through said members and having a head engaging on the outer member; and means carried by said members and bolt for drawing the members together; said bolt head having alined bores in diametrically opposite sides of the bolt head; a butterfly having inturned pivot journals pivotally received in said bores, whereby the butterfly may be disposed in raised position diametrically of the bolt, or substantially flat against the outer member; said pivot journals being square in cross section providing side faces parallel and perpendicular to the plane of the butterfly; the inner face of the bolt head being provided with an annular groove therearound; and a spring split-ring in said groove and anchored therein at parts remote from said journals and pressing against said journals and side faces thereof to yieldably hold the buttterfly in said raised position or against the outer member.

6. In combination, a pair of thick panels having adjacent edge faces; a keeper on one panel; an approximately rectangular shield plate secured fast to the face of the other panel, near the said faces and having side edges parallel and approximately perpendicular to said faces and having its intramarginal part depressed and inset in the panel; a bracket mounted on said part; approximately alined relatively slidable members adjacent to said faces, and having a hook adapted to catch on the keeper, the other member pivoted to said bracket; means for holding said members against any transverse and rotary movements in any direction relative to each other in all relative positions of the members and means carried by said members for drawing the members together.

7. A fastener comprising a keeper; relatively slidable outer and inner members, one member adapted to engage the keeper; said outer member having a hole therethrough; a bolt passing through said hole and having an inner flat face; and means carried by said members and bolt for relatively moving the members; said inner member being provided with a U-shaped cut to provide a tongue provided with a protuberance; said flat face of the bolt having a recess receiving said protuberance.

8. A fastener for securing together panels having adjacent faces, said fastener comprising a keeper lip adapted to be secured on one panel; approximately alined relatively slidable outer hasp and inner slide members adjacent to said faces, one member having a hook adapted to catch the keeper lip, the other member being pivoted to the other panel; said members having approximately registering holes therethrough; a bolt passing through said hole of the outer member and having a head engaging on the outer member; said bolt having an inner flat face flush with the inner face of the outer member; and means carried by said members and bolt for drawing the members together to a locking position; said slide member being axially provided with a U-shaped cut forming a tongue provided with a protuberance; said flat end face of the bolt having a recess near its periphery receiving said protuberance, when said members are in locking position, to yieldably stop the bolt.

9. A keeper for a fastener for securing together a pair of panels in the same plane or perpendicular to each other, said fastener having a hasp member pivotally mounted on one panel member having a wide hook disposable adjacent to the other panel; said keeper comprising a keeper plate adapted to be mounted on said other panel and having one margin at an acute angle to the plate to form a keeper lip; said keeper plate being provided intramarginally with a rectangular cut-out having an edge formed by the inner edge of said lip; whereby said keeper plate may be mounted on said other panel in positions to have either edge of the lip engaged by said hook.

10. A fastener for securing together a pair of panels in the same plane or perpendicular to each other and having said fastener comprising a hasp member pivotally mounted on one panel and having a wide hook disposable over the other panel and bent toward said faces; an approximately rectangular keeper plate adapted to be mounted on said other panel when in said same plane and having its margin nearest the hasp member inclined in a direction away from the said faces to form a keeper lip engageable by said wide hook; said keeper plate being provided intramarginally with a rectangular cut-out having an edge formed by the inner edge of said lip; whereby said keeper plate may be mounted adjacent to the hasp carrying panels on the keeper carrying panel with said lip spaced from and pointed toward the hasp carrying panel; whereby said wide hook may engage over the said inner edge of the lip.

11. A fastener for securing together a pair of thick panels in the same plane meeting in a butt joint having butt faces perpendicular to said plane, said fastener comprising approximately alined relatively slidable hasp and slide members disposable adjacent to said faces; the hasp member being adapted to be pivoted to one panel, the side member having a wide hook disposable over the other panel and bent toward said faces; an approximately rectangular keeper plate adapted to be mounted on said other panel and having its margin nearest the hasp member inclined in a direction away from the panels and said faces to form a keeper lip; whereby said wide hook may engage the lip when the slide members are drawn together to an inner locking position, and whereby said hook may clear the lip when the slide member moves to an outer unlocking position; said keeper plate being provided intramarginally with a rectangular cut-out having side edges near the side edges of the plate and an edge formed by the inner edge of said lip; whereby said keeper plate may be mounted, adjacent to the butt face of the hasp carrying panel, inset in a wide face of a keeper carrying panel having a wide face adjacent to said butt face and having the free edge of its lip adjacent to the wide outer face of the hasp carrying panel; whereby said wide hook may engage over the said inner edge of the lip to draw the wide face of the keeper panel against the butt face of the hasp carrying panel.

12. A fastener for fastening together panels having adjacent flat faces, said fastener comprising a bracket adapted to be mounted on one of the panels and having parallel upturned side ears having edge shoulders adapted to face toward a keeper secured to the other panel; a pivot pin passing through said ears parallel to the plane of said adjacent faces; a substantially flat hasp member having a part pivotally engaging said pin substantially at said ears, and holding the hasp member radial to the pin at various angular positions; a flat slide plate member longitudinally slidable on said hasp member and adapted to project across said faces and bent toward said faces to form a wide hook; means for holding said member against relative transverse and rotary movement; a bolt passing through said members and having a head on the outer member; means carried by said members and bolt for drawing the members together to a locked position with the hook locked on said keeper and moving the members from locking to unlocking position when the bolt is rotated 180 degrees; and a butterfly pivoted to said head and movable to a raised position diametrically of the bolt, or to a position against said edge shoulders to hold the bolt from rotation in locked or unlocked position of the slide member, the same ears having the triple function of holding the butterfly in the two positions, and holding the pivot pin.

13. A fastener for fastening together panels having adjacent flat faces, said fastener comprising a bracket adapted to be mounted on one of the panels and having parallel upturned side ears; a pivot pin passing through said ears parallel to said adjacent faces; a substantially flat hasp member having a part pivotally engaging said pin substantially at said ears and holding the hasp member radial to the pin at various angular positions, a flat slide plate member having its side edges slidable in said guide ways and adapted to project across said faces and bent toward said faces to form a hook; means for holding said members against relative transverse and rotary movement; a bolt rotatably mounted on the hasp member; means carried by said members and bolt for drawing the members together to a locked position with the hook locked on said keeper and moving the members from locking position; and a butterfly pivoted to said bolt and movable to a raised position diametric of the bolt, or to a position against said ears to hold the bolt from rotation in locked position of the slide member; said ears having the quadruple function of pivotally supporting said pin and holding the butterfly in locking position, and holding the hasp member radial to the axis of the ears.

References Cited in the file of this patent

UNITED STATES PATENTS

| | | |
|---|---|---|
| 83,983 | Marvin | Nov. 10, 1868 |
| 212,431 | Benson | Feb. 18, 1879 |
| 395,685 | Baringer | Jan. 8, 1889 |
| 668,019 | Reid | Feb. 12, 1901 |
| 789,568 | Roe et al. | May 9, 1905 |
| 902,793 | Alford | Nov. 3, 1908 |
| 1,030,073 | Gibbs | June 18, 1912 |
| 1,269,194 | King | June 11, 1918 |
| 1,283,037 | Baltzley | Oct. 29, 1918 |
| 1,381,733 | O'Connor | June 14, 1921 |
| 1,400,952 | Hennicke | Dec. 20, 1921 |
| 1,469,196 | Strange | Sept. 25, 1923 |
| 1,682,060 | Banks | Aug. 28, 1928 |
| 2,001,216 | Sand | May 14, 1935 |
| 2,340,864 | Carpenter | Feb. 8, 1944 |
| 2,378,654 | Pekny | June 19, 1945 |
| 2,486,686 | Shreve | Nov. 1, 1949 |

FOREIGN PATENTS

| | | |
|---|---|---|
| 740,930 | France | Nov. 22, 1932 |